United States Patent Office 2,829,079
Patented Apr. 1, 1958

2,829,079

FLUX

Moses Elisberg, Bronx, N. Y.

No Drawing. Application September 26, 1955
Serial No. 536,776

6 Claims. (Cl. 148—26)

This invention relates to a flux which is used for soldering or similar operations.

The flux of this invention has considerable advantages over the flux preparations presently used.

Fluxes are generally classified into corrosive (acid types) and non-corrosive (rosin-types). If a corrosive type is used good adhesion of solder to metal is obtained but corrosion of the metal takes place. On the other hand the conventional non-corrosive type of soldering flux gives relatively poor adhesion of solder to metal.

It is an object of this invention to produce a flux that will be non-corrosive but which will give good adhesion of solder to metal.

It is a further object of this invention to produce a flux which will be non-toxic in use.

It is a further object of this invention to produce a flux which will adhere completely to the object to be soldered.

It is a further object of this invention to produce a flux which will cause soldering to be accomplished with a minimum of solder used.

It is a further object of this invention to produce a flux which will restore oxidized metal to unoxidized condition.

The invention may be briefly described as comprising a flux composed of a zinc halide (preferably zinc chloride) and an alkali metal carbonate (preferably sodium carbonate). Where the flux is to be used for hard soldering borax is added to the mixture.

The flux of this invention must be prepared by the specific method of manufacture hereinafter set forth. If the components of the flux are formed in any other manner the invention is not operative.

Because of the method used in preparing the flux of this invention it also contains a quantity of an alkali metal halide (in the preferred modification sodium chloride). It appears that the alkali metal halide is necessary for proper action of the flux of this invention. Furthermore some unreacted acid is present in the mixture, which material is also required for the proper operation of the invention.

The flux is prepared for soft soldering by taking a hydrohalic acid (preferably hydrochloric acid) and dissolving zinc therein at room temperature until no hydrogen evolves from the mixture. An alkali metal carbonate (preferably sodium bi-carbonate) is added to the mixture and the solution is left standing until no further carbon dioxide evolves. The solution is then filtered and is ready for use.

Where a hard soldering flux is desired the soft soldering flux is modified by adding borax thereto until a paste is formed.

The invention will be further described by reference to specific examples of the practice thereof.

*Example one.—Soft soldering flux*

Four ounces of hydrochloric acid were added to eight ounces of granulated zinc and the mixture permitted to stand until no further hydrogen was evolved. Two ounces of sodium bi-carbonate was then added to the mixture and the mixture was again permitted to stand until no further carbon dioxide was evolved. The mixture was then filtered and was ready for use.

*Example two.—Hard soldering flux*

The soldering flux produced by Example 1 was modified by adding four ounces of borax thereto thereby forming a hard paste.

*Example three.—Hard soldering flux*

The soldering flux produced by Example 1 was modified by adding two ounces of borax thereto thereby forming a soft paste.

The foregoing specific embodiments of this invention as set forth in the specification herein are for illustrative purposes and for purposes of example only. Various changes and modifications can obviously be made within the spirit and scope of this invention.

I claim:

1. As a new composition of matter a soldering flux formed by the interaction of 2 parts of a hydrohalic acid and four parts of zinc and the subsequent interaction of 1 part of an alkali metal carbonate.

2. As a new composition of matter a soldering flux formed by the interaction of 2 parts of a hydrohalic acid and four parts of zinc and the subsequent interaction of 1 part of an alkali metal bicarbonate.

3. As a new composition of matter a soldering flux formed by the interaction of 2 parts of hydrochloric acid with four parts of zinc and the subsequent interaction of 1 part of an alkali metal carbonate.

4. As a new composition of matter a soldering flux formed by the interaction of 2 parts of hydrochloric acid with four parts of zinc and the subsequent interaction of 1 part of an alkali metal bicarbonate.

5. As a new composition of matter a soldering flux formed by the interaction of 2 parts of hydrochloric acid with four parts of zinc and the subsequent interaction of 1 part of sodium bicarbonate.

6. As a new composition of matter a soldering flux formed by the interaction of 2 parts of hydrochloric acid with four parts of zinc, the subsequent interaction of 1 part of sodium bicarbonate and the addition thereto of 2–4 parts of borax.

References Cited in the file of this patent

UNITED STATES PATENTS

| | | |
|---|---|---|
| 242,674 | Moore | June 7, 1881 |
| 885,668 | Davies et al. | Apr. 21, 1908 |
| 1,256,429 | Beaulieu | Feb. 12, 1918 |
| 2,443,169 | Shanklin | June 8, 1948 |